United States Patent
Shahraray et al.

(10) Patent No.: US 9,875,448 B2
(45) Date of Patent: Jan. 23, 2018

(54) MOBILE SERVICE PLATFORM

(75) Inventors: Behzad Shahraray, Holmdel, NJ (US); Andrea Basso, Marlboro, NJ (US); Lee Begeja, Gellette, NJ (US); David C. Gibbon, Lincroft, NJ (US); Zhu Liu, Marlboro, NJ (US); Bernard S. Renger, New Providence, NJ (US); Eric Zavesky, Hoboken, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 287 days.

(21) Appl. No.: 13/307,888

(22) Filed: Nov. 30, 2011

(65) Prior Publication Data
US 2013/0138461 A1     May 30, 2013

(51) Int. Cl.
   *G06Q 10/00*     (2012.01)
   *G06Q 10/06*     (2012.01)
   *G06Q 10/10*     (2012.01)
   *G06Q 30/06*     (2012.01)

(52) U.S. Cl.
CPC .............. *G06Q 10/06* (2013.01); *G06Q 10/10* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 6,578,005 B1 * | 6/2003 | Lesaint et al. ............... | 705/7.14 |
| 7,565,306 B2 * | 7/2009 | Apostolides ........... | G06Q 10/06 705/7.26 |
| 8,099,311 B2 * | 1/2012 | La Vecchia et al. ........ | 705/7.14 |
| 9,374,271 B2 * | 6/2016 | Hasegawa ........... | H04L 41/0618 |
| 2001/0047280 A1 * | 11/2001 | Alexander et al. ............... | 705/1 |
| 2002/0133545 A1 * | 9/2002 | Fano et al. ..................... | 709/203 |
| 2003/0203730 A1 * | 10/2003 | Wan et al. .................. | 455/404.2 |
| 2007/0036300 A1 * | 2/2007 | Brown et al. .............. | 379/88.22 |
| 2008/0065422 A1 * | 3/2008 | Weber .............................. | 705/3 |
| 2008/0228733 A1 | 9/2008 | Davis | |
| 2008/0288321 A1 * | 11/2008 | Dillon ................ | G05B 23/0283 705/7.13 |
| 2009/0100178 A1 * | 4/2009 | Gonzales et al. ............. | 709/226 |
| 2010/0198814 A1 | 8/2010 | Peterson | |
| 2011/0022550 A1 | 1/2011 | Pennacchiotti | |

(Continued)

OTHER PUBLICATIONS

Howe, Jeff. "The Rise of Crowdsourcing"; Wired, Jun. 2006; http://wired.com/wired/archive/14.06/crowds.html.*

(Continued)

*Primary Examiner* — Stephanie Z Delich
(74) *Attorney, Agent, or Firm* — Akerman LLP; Michael K. Dixon; Mammen (Roy) P. Zachariah, Jr.

(57) ABSTRACT

A method and apparatus for a service platform capable of providing device-based task completion is disclosed. A request for a task is received at a service platform from a customer. A worker device to complete the task is selected from a group of worker devices registered with the service platform based on a current attribute of the worker device. Data resulting from completion of the task is received from the selected worker device, validated, and presented to the customer. A reward or incentive can be provided to the worker device in response to the data being received from the worker device and validated.

20 Claims, 5 Drawing Sheets

(56) References Cited

U.S. PATENT DOCUMENTS

| | | | |
|---|---|---|---|
| 2011/0022598 A1 | 1/2011 | Pennacchiotti | |
| 2011/0034179 A1* | 2/2011 | David | G01S 5/0236 455/456.1 |
| 2011/0143811 A1* | 6/2011 | Rodriguez | 455/556.1 |
| 2011/0151898 A1 | 6/2011 | Chandra | |
| 2011/0173214 A1 | 7/2011 | Karim | |
| 2011/0191693 A1 | 8/2011 | Baggett et al. | |
| 2011/0276896 A1* | 11/2011 | Zambetti | H04L 12/1813 715/751 |
| 2014/0282257 A1* | 9/2014 | Nixon | G05B 11/01 715/835 |

OTHER PUBLICATIONS

Howe, Jeff. "Crowdsourcing"; Wired, May 27, 2008; http://crowdsourcing.typepad.com/.*

Lopez Mariana, Vukovic Maja, Laredo Jim, 2010, PeopleCloud Service for Enterprise Cloudsourcing, IEEE International Conference on Services Computing, pp. 538-545.*

* cited by examiner

MOBILE SERVICE PLATFORM

FIELD

The present disclosure relates generally to crowd based services and more particularly to a crowd based service platform that provides opportunistic device-based completion of tasks.

BACKGROUND

Crowdsourcing is the act of outsourcing tasks, traditionally performed by an employee or contractor, to a large group of people or a community, referred to as a crowd. Typical crowdsourcing tasks utilize an open call, which invites members of the public to carry out the task or portions of the task. In this form of distributed problem solving, various solutions are typically submitted by the crowd, and the crowd can also review the various solutions to find the best solutions. Crowdsourcing is increasing in use in a variety of fields as a relatively inexpensive way to find creative solutions to problems.

One type of crowdsourcing allows "requesters" to post tasks that can then be completed by "providers". Such tasks typically require human intelligence and are typically tasks that computers are unable or not well suited to perform.

BRIEF SUMMARY

In recent years, mobile devices have been provided with increasing capabilities of capturing various types of information, such as pictures, video, audio, GPS data, etc. Embodiments of the present disclosure provide a service platform that can utilize mobile devices as sensors capable of opportunistically collecting information from various locations in order to provide a service that provides device-based task completion for customers. Embodiments of the present disclosure further provide a service platform that can manage task scheduling, opportunistically select worker devices to complete a task, process data received from worker devices, and provide an incentive structure to motivate owners of worker devices.

In one embodiment, a request for a task is received at a service platform from a customer. A worker device to complete the task is selected from a group of worker devices registered with the service platform based on a current attribute of the worker device. Data resulting from completion of the task is received from the selected worker device, and the data resulting from completion of the task is presented to the customer.

In another embodiment, apparatus for providing a mobile service platform includes an account manager configured to manage customer accounts for a plurality of customers registered with the service platform and worker device accounts for a plurality of worker devices registered with the service platform, a task scheduler configured to schedule tasks requested by customers and to select a worker device from the plurality of worker devices for each scheduled task based on a current attribute of the worker device, a data manager configured to validate data resulting from completion of a scheduled task by a selected worker device, and a payment manager configured to transfer a reward to a selected worker device in response to validation of the data resulting from completion of a scheduled task by the selected worker device.

These and other advantages of the disclosure will be apparent to those of ordinary skill in the art by reference to the following detailed description and the accompanying drawings.

DETAILED DESCRIPTION

The present disclosure generally provides a method and system for providing an opportunistic device-based service platform. Embodiments of the present disclosure utilize stationary or mobile devices as sensors to opportunistically complete tasks requested by customers. The service platform schedules tasks requested by customers and opportunistically selects devices to complete the tasks, in that the devices are automatically selected based on current attributes (e.g., location) of the devices.

Figure 1:
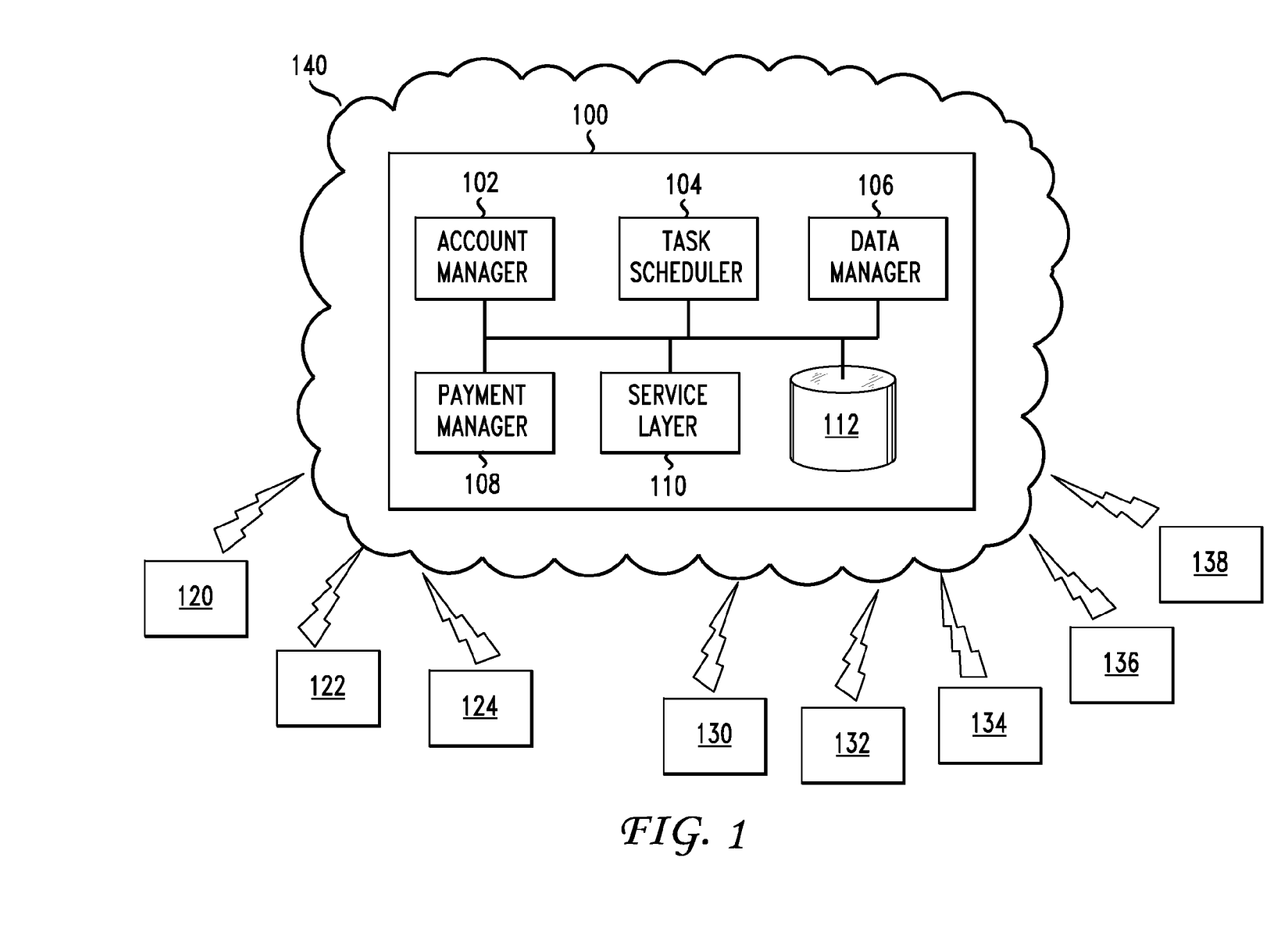
FIG. 1 illustrates a mobile service platform according to an embodiment of the present disclosure.

FIG. 1 illustrates a mobile service platform according to an embodiment of the present disclosure. As illustrated in FIG. 1, mobile service platform 100 communicates with customers 120, 122, and 124 and worker devices 130, 132, 134, 136, and 138 via network 140. The mobile service platform 100 may be implemented on a server or multiple distributed servers. The network 140 may be the Internet, a cellular network (e.g., a 3G or 4G network), or any other type of data network. Further, although FIG. 1 illustrates a single network 140, mobile service platform 100 may communicate with different devices using different types of networks. For example, mobile service platform may communicate with the customers 120, 122, and 124 over the Internet and communicate with one or more of the worker devices 130-138 over a cellular or WiFi network.

As shown in FIG. 1, mobile service platform 100 includes an account manager 102, a task scheduler 104, a data manager 106, a payment manager 108, a service layer 110, and a database 112. The account manager 102 manages customer accounts for customers 120-124 that utilize the service provided by the service platform 100 and worker accounts associated with worker devices 130-138 registered with the service platform 100. The task scheduler 104 allows customers 120-124 to create tasks, schedules tasks created by the customers 120-124, and selects a worker device (or set of worker devices) from a group of registered worker devices 130-138 to perform each task. The data manager 106 collects data resulting from completed tasks from worker devices 130-138 and provides data analysis and data validation of the collected data. The payment manager 108 transfers payment to worker devices 130-138 in response to completed tasks by the worker devices 130-138. Although this payment may be a monetary payment from a customer 120-124 to a worker device 130-138, the present disclosure is not limited thereto and the payment may be any type of reward transferred to worker device 130-138 in response to successful completion of a task. The monetary payment may not be transferred directly to a worker device but other indirect methods may apply such as crediting a bank account.

The service layer 110 of the mobile service platform 100 communicates with customers 120-124 over the network 140. The service layer 110 can provide an interface, such as a web-based graphical user interface (GUI) that allows customers 120-124 to create and monitor tasks and view data resulting from completed tasks. The service layer 110 may also deliver the data and content generated from the data directly to devices of the customers 120-124.

The database 112 may be implemented as a single central database or as multiple distributed databases. The database 112 stores information related to registered customers 120-124 and information related to registered worker devices 130-138. The database 112 also stores task information relating to tasks created by customers 120-124 and scheduled by the task scheduler 104. The database 112 also stores data collected from worker devices 130-138 as a result of tasks being completed, as well as data or content resulting from processing the collected data by the data manager 106. Although illustrated in FIG. 1 as a single database 112, database 112 may be multiple separate databases. For example, the service platform 100 can maintain multiple distinct databases including a customer database, worker device database, task database, and data database.

The customers 120-124 may communicate with the mobile service platform 100 from any type of network enabled device, such as a computer, mobile device, set top box, television, appliance, etc. Customer accounts that are registered with the service platform 100 are tied to a customer, such as an individual or a business, but not necessarily tied to a specific device. However, customer accounts could be tied to a preferred device.

According to an advantageous embodiment, the customers 120-124 may access the service platform 100 through a customer interface provided by the service layer 110. For example, the customer interface may be a web-based GUI that can be accessed using a web browser on a customer device. The customer interface can provide the customers 120-124 with a tool to create and manage various tasks on the service platform 100. The customer interface may include monetary controls to allow a customer to control funds provided to a customer account, as well as analytics to allow customers 120-124 to view how their money is being spent. The customer interface may further include an interface for task creation that allows a customer to create tasks and specify task requirements. The customer interface may further include task monitoring that allows a customer to view how many and which tasks are completed, the rate of completion for the customer's task, and statistics relating to the completion of tasks aggregated across data collected for the customer's tasks. The customer interface may provide to a customer discovery of related tasks to the customer's tasks. In particular, the service platform 100 may find related tasks that are designated for resale and suggest these tasks to a customer using the customer interface. The customer interface can also provide information associated with the related tasks, such as how much monetary incentive is provided for the related tasks and how fast the related tasks are completed. The customer interface may further provide a dashboard with statistics related to the service platform 100, showing how much data is being stored for the customer in the database 112 and providing an average throughput of data (uploads, downloads, bytes transferred) to give a real-time review of particular tasks associated with a customer.

According to an embodiment of the present disclosure, the worker devices 130-138 are specific devices that are registered with the mobile service platform 100. While owner information may be known and stored for each worker device 130-138, the worker device accounts registered with the mobile service platform 100 are device-specific, i.e., tied to the particular device. The worker devices 130-138 can be sensor devices capable of digitally capturing a real-world observation at a specific time and sending information to the service platform 100. The worker devices 130-138 can complete tasks by sending data reflecting measurements or observations to the mobile service platform 100 over the network 140.

According to an advantageous embodiment, one or more of the worker devices 130-138 are mobile devices. Mobile devices are personal communication devices, such as cellular telephones, tablet devices, personal digital assistants (PDAs), etc., that may be carried with an owner and typically include functionality to capture real-world observations and connect to the network 140. Data captured by such mobile devices may include, but is not limited to, picture data, video data, audio data, global positioning system (GPS) data, signal strength, light sensor data, temperature data, pollution data (e.g., data from an air quality sensor), and data requiring higher levels of intelligence and interpretation that may require involving an owner of the device. In addition to mobile devices, the worker devices 130-138 may also include fixed location devices. In addition to sensor information, the worker devices 130-138 can also provide information, such as time, location, and date information, and age, sex, and demographic information associated with owners of the sensor devices 130-138.

The worker devices 130-138 can run a worker interface through which the worker devices 130-138 communicate with the service platform 100. In one embodiment, the worker interface can be implemented as software installed on a worker device and executed by a processor of a worker device. For example, the software may be a native application of the worker device. The worker interface allows an owner of the worker device to specify preferences regarding what types of tasks can be completed using the worker device and limitations of tasks requested. For example, preferences can be set to prevent the program from running after certain hours or to stop the program when the battery of the worker device is low. The worker interface may allow an owner to see a balance of the owner account and to manage tasks on the worker device. In particular, the worker interface may provide a record of which tasks have been completed by the worker device, may show the owner of the worker device which tasks the worker device has been selected for, and can provided statistics related to task completion in a region in which the worker device is located, such as the average payout and completion time of worker devices in the region. The worker interface can allow different worker devices to establish a "social connection" for collaborative tasks. The worker interface can provide a voice channel to talk to other worker devices having a social connection. The worker interface can allow two-way dialog between collaborating worker devices for what is needed to complete a collaborative task.

According to an advantageous embodiment, the worker interface can provide an augmented reality view that would visualize available tasks that the worker device is eligible to be selected for on a screen of a worker device. This augmented reality view can direct an owner to locations at which the worker device will be selected to perform particular tasks. For example, when an owner looks at a real-time image through a camera viewer of the worker device, the image on the screen can show locations that correspond to various tasks for which the worker device is qualified. It is also possible the screen of the worker device can show a heat map that shows how high a concentration of tasks is at certain locations. The worker interface can also provide an alerting service that alerts the owner of a worker device when the worker device is selected to perform a task.

Figure 2:
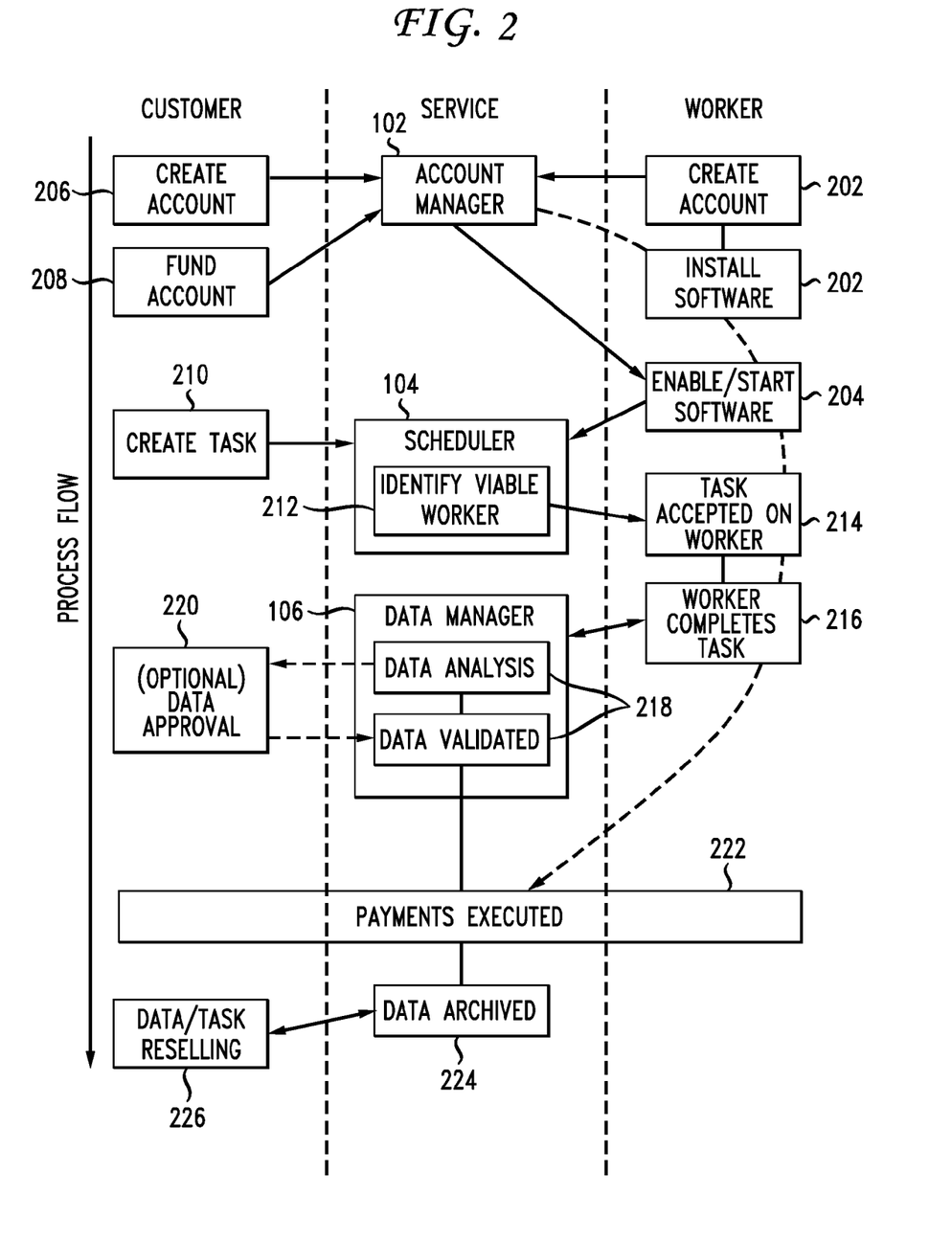
FIG. 2 illustrates interactions between the mobile service platform, a customer, and a worker device according to an embodiment of the present disclosure.

FIG. 2 illustrates interactions between the mobile service platform, a customer, and a worker device according to an embodiment of the present disclosure. As illustrated in FIG. 2, at 202, a worker device creates an account with the account manager 102 of the service platform and software is installed on the worker device. The software installed on the worker device can provide the service platform with direct access to various applications of the worker device. The software can also provide security and allow the service platform to ensure that the registered worker device is not impersonated. The software can allow the device to be discovered by the service platform when the device is active, and also advertise the presence of the device to other registered worker devices. In some worker devices, it is possible that the software can be preinstalled in a native operating system of the worker device.

When an account is created for a worker device by the account manager 102, a worker device profile can be stored on the database 112. The worker device profile can include identification information for the device, as well as an owner of the device. The worker device profile can include a list of sensor capabilities of the device as well as demographic information related to the owner of the device. The worker device profile can also include various account settings controlling preferences associated with the worker device, such as reward preferences, alert preferences, authorization preferences, and participation preferences. Reward preferences allow an owner of the user device to select a method or type of reward structure to receive for completed tasks. Alert preferences allow an owner to specify how to be alerted when the worker device is selected for a task. Authorization preferences allow an owner to specify what authorization is required for the worker device to accept a task. Participation preferences allow an owner to specify how often and when the worker device should be considered for task selection and what types of tasks the worker device should be considered for.

Once the software is installed on a worker device and an account is created for the worker device, at 204, the worker device is enabled by the account manager and the software starts running on the worker device. When the software is running on the worker device, the worker device is discovered as a running worker device by the task scheduler 104 of the service platform.

At 206, a customer creates an account with the account manager 102 of the service platform. The customer may be an individual, business, organization, etc. When an account is created for a customer, a customer profile is stored in the database 112. The customer profile can include identification information and authentication information for the customer. The customer profile can also include payment information relating to how payment will be made to worker devices for completed tasks. Once an account is created for a customer, at 208, the customer can fund the account. For example, the customer may store funds in a dedicated account and provide account information for the account so that the service platform can access the account to provide payment to worker devices.

At 210, a customer creates a task. In particular, the customer can interact with the task scheduler 104 of the service platform to define and request a task. The customer can define the requirements for a worker device that will complete the task. For example, the task may require certain device attributes or capabilities, a device to be at or near a certain location, or certain demographic information related to the owner of the device. The customer can also define what action is necessary to complete the task. For example, the task may require collecting sensor data or may require active interaction of the owner of a device. The task may be time sensitive and require completion at or by a specific time. The customer may also define the reward or payment for completion of the task. The customer's request may involve a series of tasks. In this case, the tasks can be individually requested by the customer or the task scheduler can recognize that the task requested by the customer actually requires multiple tasks and automatically schedule the required multiple tasks. The task scheduler 104 verifies that there are sufficient funds in the customer's account to cover the task(s) requested and then schedules the requested task(s). The task can be scheduled as a one-time task or a periodic task. A one-time task can be requested immediately or when attributes of a worker device meet the requirements for the specific task. A periodic task can be scheduled at a certain time or day, week, hour, month, etc.

One type of task that can be performed using the mobile service platform is device-based sensor readings, such as position information, network information, low-level sensor information, activity/usage data, visual data, and audio data. Position information can be measured over time and this data can be processed (e.g., by the data manager 106) to calculate speed information or for activity estimation (e.g., driving, walking, etc.). Static position updates can be requested for habitation experiments. Tasks involving network information can include bandwidth tests at different locations and connectivity tests at different locations. Low level sensor information can include gyro static information to see how a device is held, gyro information over time to see how a device is manipulated over time, temperature information, and electromagnetic information. The temperature information can be passive (where a temperature is read for a device wherever the device currently is), or active (where the owner of the device is asked to go to a specific location, expose the device to air for N seconds, and take a temperature measurement). Similarly, electromagnetic field measurements can be passive or active to measure the density of a magnetic field on different surfaces. Generic activity or usage tasks may record all sensors to see what is happening for a user. Visual data tasks can include tasks that require a user to take an image or video of a specific location or activity. The selection of worker devices for such tasks can be filtered by a compass and GPS to guarantee the specific location. Such filtering can also be used in an interactive fashion to ask the user to move to the correct location or orientation of the worker device. The filtering can occur both during device selection and on the device when the images are taken. Audio data tasks can include passive audio data collection or a requested audio collection that is recorded at a specific location or time where an owner is required to read a prompt or respond to a query. This can be used to measure noise levels at different locations or times.

Another type of task that can be performed by the mobile service platform is the collection of user interaction data. One such user interaction task is a labeling task that requests that a user provide a textual description to label a reading from a device, such as a sound, video, image, activity, etc. Another type of user interaction task is a usability task in which statistics regarding device timing of user interactions and the user's respective environmental conditions are recorded as data when running simple template-based scripts. Such usability tasks can be used to measure how responsive an interface is under various activity conditions (the worker device can be selected based on the activity conditions) or to collect environment-specific interactions over a variety of stimuli that are systematically substituted into a template-based interface. Tasks can also be created for long-term user interaction events, in which a worker device continues to submit sensor data as part of the task, but the behavior of the interface changes with different data thresholds. Tasks can also be created for other random or open events, for which a task is not well defined but requires a user to complete the task ad hoc. Such tasks may require the user to be at a specific location and thus select worker devices at or near that location.

Another type of task supported by the mobile service platform is collaborative tasks. These tasks require the collaboration of two or more worker devices and may select worker devices that have established "social connections" within the system. Collaborative tasks may be limited to network-light tasks, such as watching from a network-based source or such as simple messaging routines, and a library may be provided in the software on the worker devices to perform the message passing. Collaboration for user-based interaction could be done passively, where owners participate in a task when their worker devices detect that they are close to each other. This type of task can be activated explicitly (instruct an owner to approach another owner) or implicitly (sensing proximity between worker devices). Another collaboration task is a synchronous capture task in which multiple worker devices that have established a "social connection" are requested to capture the same event, by taking input from a sensor, a video, or an audio feed. In this case, each stream from a different worker device can be stamped with geo-position, compass information, etc. Other collaboration tasks can involve owners of worker devices interacting with each other to solve a set of tasks, in which additional tasks are added as tasks are completed.

Returning to FIG. 2, at 212, the task scheduler 104 of the mobile service platform selects from a pool of running worker devices, a worker device to perform a scheduled task. The worker device is selected based on current attributes of the worker device. For location specific tasks, a worker device can be selected based on a current location of the worker device at a time that the task needs to be completed. In such cases, the task scheduler 104 selects a worker device that is capable of performing the action necessary to complete the task and is located at the correct location. In a case in which no worker device capable of completing the task is at the correct location, the task scheduler 104 may select a mobile worker device capable of completing the task that is nearest to the correction location, and request that the worker device be moved to the correct location. In addition to location, other device attributes such as, device capabilities (e.g., a device with a higher quality camera may be preferable for an image related task), environmental conditions (e.g., temperature, amount of light, etc.) at the worker device, physiological conditions of an owner (e.g., pulse, blood pressure, etc.) measured by the worker device, or owner demographic information associated with the worker device, may be used for selection of the worker device depending on the task. The selection of the worker device can also be filtered by participation properties associated with the worker device, a reliability score of past results of the worker device, the number of tasks previously completed by the worker device, and network/device latency issues that affect how fast the task can be fulfilled. The task scheduler sends a task request to the selected worker device. The task request can be sent with a specific encryption key related to that task. The selected worker device can then accept or deny the task request.

At 214, a selected worker device accepts a task request. At 216, the worker device completes the task and sends the resulting data to data manager 106 of the service platform. In particular, the worker device performs whatever actions is necessary to compete the task, and then sends the specific data requested for that task along with the specific encryption key associated with the task to the data manager 106 of the service platform. The task is then removed from the scheduled pool of tasks.

At 218, the data manager 106 of the service platform analyzes and validates the data received from the worker device. The data can be analyzed by pooling or aggregating the data with other data received from other devices performing similar or related tasks to generate some type of content to provide to the customer. The data can also be validated to make sure that the data is appropriate for the particular task. It is possible that the data is validated by comparing the data to parameters specified by the customer. It is also possible that the data is validated by measuring deviation between the data and data received from other worker devices performing the same task or data resulting from previous similar tasks, and removing outliers. If the data is image, video, or audio data, the quality of the data can be measured. The data can also be validated based on the amount of time that the worker device takes to complete the task. For example, if the amount of time that the worker device took to complete the task is much less than an expected amount of time necessary to complete the task, the data may be considered invalid. Conversely, if the worker device does not provide a response to a certain stimulus within a short enough time, the data may be considered invalid. Data, such as image, video, or audio data, received from the worker device may include metadata, such as labels or timestamps. In this case, the data manger 106 may give higher weight to data including metadata when filtering the received data. As shown in FIG. 2, at 220, customer approval of the data can optionally be required. The data manager 106 and/or the customer may also provide a rating for the data from a particular worker device, and this rating can be used to update a rating of the worker device stored in the worker device profile and used in worker device selection.

At 222, payment is executed by the payment manager 108 of the service platform. The payment may be any type of reward provided to the worker device (or the owner of the worker device) in response to completion of a task. In the embodiment of FIG. 2, a monetary payment is provided for the worker device. The account manager 102 can provide the payment manager 108 with account information corresponding to the customer and the worker device, and the payment manager can transfer the payment from the account of the customer to an account associated with the worker device. This payment can be conditioned on approval of the data received from the worker device by the data manager 106 and/or the customer. The customer can define an Automated Clearing House (ACH)/Electronic Funds Transfer (EFT) account or a credit card account. For deposits, ACH is used by the customers to inject funds as necessary. A credit card can be used to periodically draw funds out before they have been scheduled. The payments to the worker device may be micropayments or there may be a limit to the total payout for a worker device.

Other forms of rewards, such as information, billing discounts, vendor rebates, etc., may be utilized instead of or in addition to monetary payments. In one possible implementation in which worker devices are also associated with customer accounts, a de facto barter system can be implemented, where the payment for a completed task by a worker device is a credit to the owner associated with that worker device that can be used for completion of a different task by a different worker device.

At 224, the data is archived for the customer. For example, the data can be stored in the database 112, and the service layer 110 can provide an interface that allows the customer to view the data. The interface can also allow the customer to view various statistics related to the collection of the data, such as a location where the data was collected, a time at which the data was collected, a frequency with which the data was collected, latency in collecting/delivering the data, other anonymous information regarding data collection, and/or personal information relating to an owner/user of the worker device that provided the data. The customer may also be able to download the raw data related to the customer's task. In a possible implementation, the customer may be required to pay an additional fee to download the raw data. The customer may also be required to pay an additional fee for long term storage of the data on the database 112. Such long term storage can be used to collect large amounts of data over long period of time to provide macro-level analysis of the data in order to derive other statistics.

At 226, the data for a particular task may be resold to other customers. For example, a customer who requested the data may be incentivized to allow the service platform to resell the data to other customers who may be interested in the data in response to a payment or by subsidizing the cost of the task or future tasks. The customer may be able to opt out of the data reselling.

Figure 3:
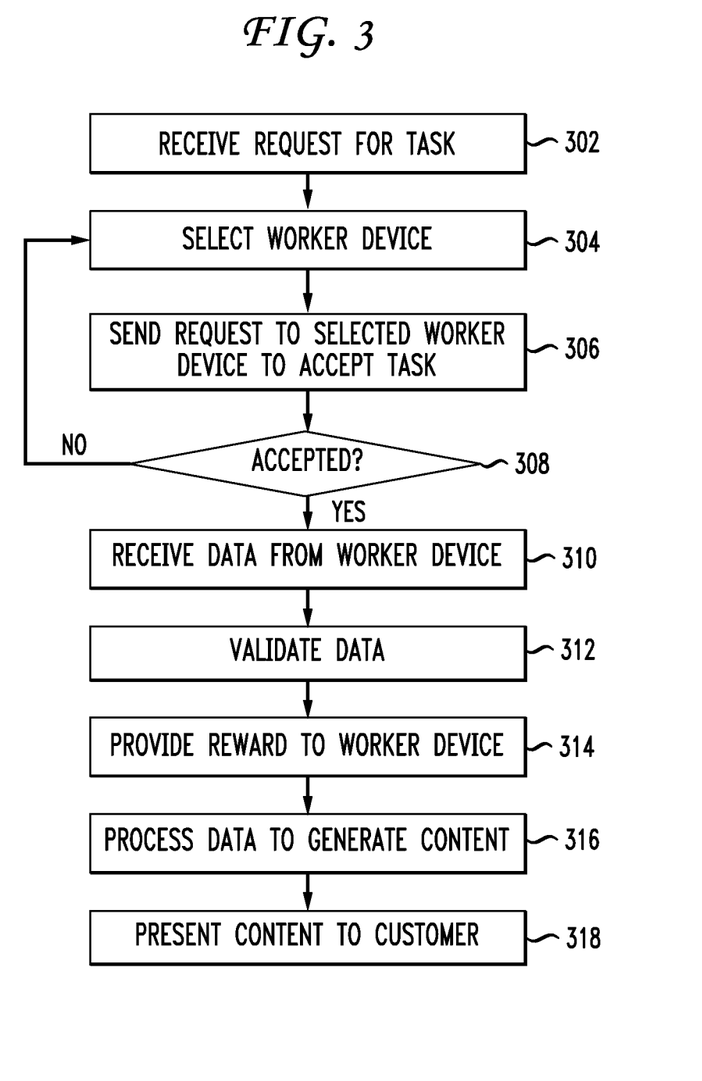
FIG. 3 illustrates a method of providing device-based service according to an embodiment of the present disclosure.

FIG. 3 illustrates a method of providing device-based service according to an embodiment of the present disclosure. As illustrated in FIG. 3, at 302, a request for a task is received from a customer. At 304, a worker device is selected from a group of registered worker devices to complete the task. The worker device is accepted based on an attribute of the worker device. For example, the worker device may be selected based on a current location of the worker device, current environmental conditions at the worker device, sensor capabilities of the worker device, or demographics of a user associated with the worker device. The worker device can also be selected by a combination of attributes of the worker device. The worker device selection filters the registered worker devices to select a worker device that is capable of performing the selected task.

At 306, a request is sent to the selected worker device to accept the task. At 308, it is determined whether the task is accepted by the selected worker device. For example, a message can be received from the worker device indicating whether the task was accepted or denied. If the task is not accepted by the worker device, the method returns to 304 and a different worker device is selected. If the task is accepted by the worker device, the method proceeds to 310.

At 310, data resulting from completion of the task is received from the worker device. For example, if the task requested sensor data to be measured, the sensor data is received from the worker device. If the task requested image, video, or audio data, the corresponding data is received from the worker device. At 312, the data is validated. For example, the data may be validated by comparing the data to predetermined parameters, such as parameters received from the customer. The data may also be validated by comparing the data to data resulting from completion of previous related tasks (e.g., previous iterations of a periodic task). The data may also be validated using various data processing applications, such as image or video processing applications that determine a quality of the data.

At 314, a reward is provided to the worker device in response to the validation of the data. For example, monetary payment may be transferred from a customer account to an account associated with the worker device.

At 316, the data is processed to generate content. For example, the data may be aggregated with other data resulting from other tasks or may be combined with data resulting from previous similar tasks (e.g., previous iterations of a periodic task). For example the content may be a time-series analysis that is generated based on previous sensor data and the received data from the worker device. The content may also be aggregated data involving different locations at a given time. In this case, the data is retrieved for a series of similar tasks completed by different worker devices at different locations. For example, multiple images received from mobile worker devices at different locations can be combined and processed using a photostitch algorithm to generate a reconstructed 3D image or a panoramic image. Multiple types of data may be combined in a composite presentation. For example, images from cameras of one or more worker devices and temperature data in an interpolated form can be used to generate an image that displays the temperature at each location by positioning a pointing device (e.g., a mouse) on a point in the image. Various types of data can be processed to organize the data and present the data in reports. Further, other data not collected from the worker devices can also be combined with the data collected from the worker devices. At 318, the content is presented to the customer. For example the content may be archived and presented to the customer on web-based interface.

Figure 4:
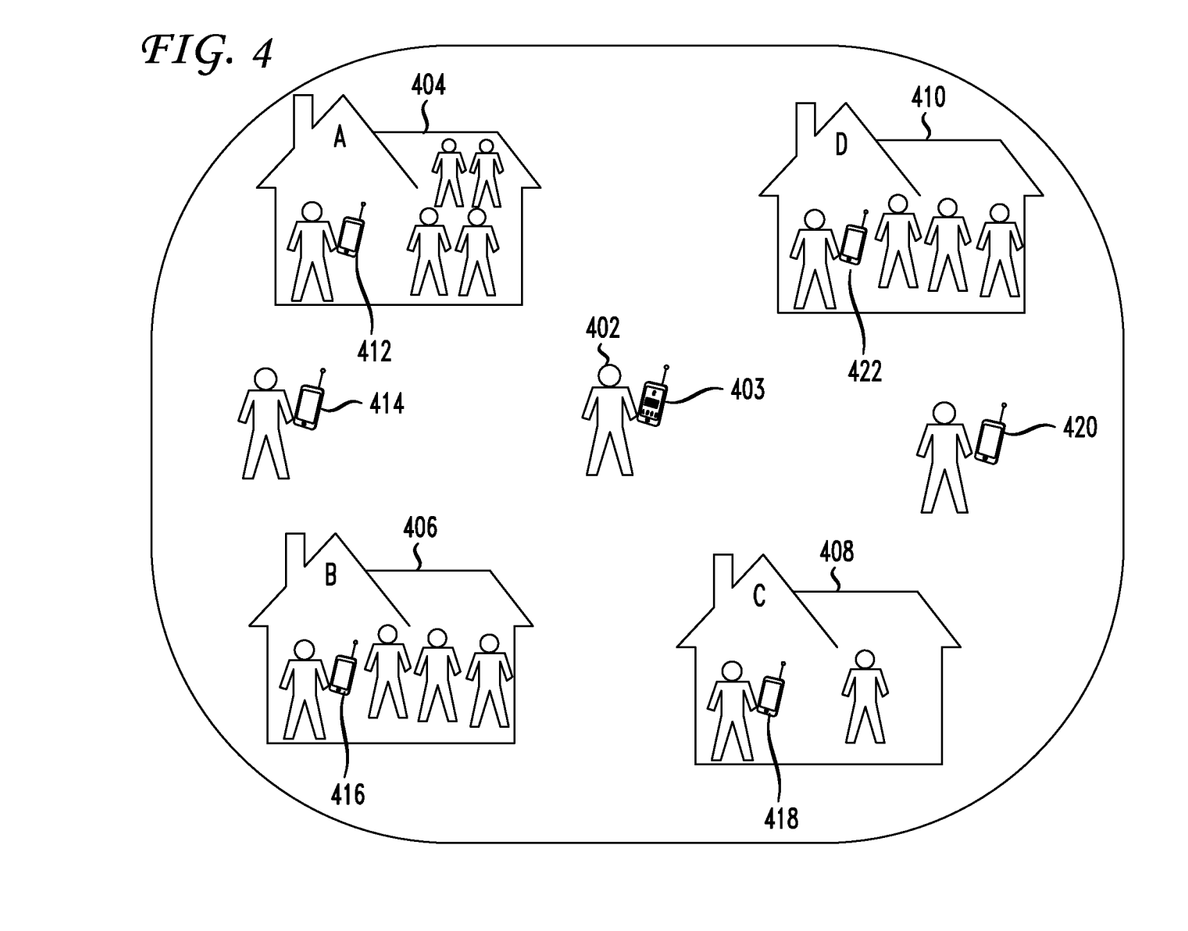
FIG. 4 illustrates an example of mobile worker devices being used to complete tasks for a customer.

FIG. 4 illustrates an example of mobile worker devices being used to complete tasks for a customer. In the example of FIG. 4, a customer 402 has created a task of finding the least busy coffee shop of the four coffee houses A (404), B (406), C (408), and D (410) on her way to work. The mobile service platform (not shown) schedules a separate task of recording position and wait time in each of the four coffee houses A (404), B (406), C (408), and D (410). These tasks may be scheduled as periodic tasks that can be performed at a certain time each morning. Worker devices 412, 414, 416, 418, 420, and 422 are mobile devices that are registered with the mobile service platform as worker devices. At the scheduled time for the tasks, the mobile service platform identifies that worker devices 412, 416, 418, and 422 are at coffee shops A (404), B (406), C (408), and D (410), respectively, and selects each worker device 412, 416, 418, and 422 to perform the respective task at the corresponding coffee shop A (404), B (406), C (408), and D (410). A request can be sent to each of worker devices 412, 416, 418, and 422 to accept the respective task and collect position data and wait time data while in the respective coffee shop A (404), B (406), C (408), and D (410). In response for this data, accounts associated with worker devices 412, 416, 418, and 422 can be credited with a micropayment. The mobile service platform can then compare the wait times at each coffee shop A (404), B (406), C (408), and D (410), and the customer 402 can view the wait times on a web-based customer interface 403.

Although position and wait time information are collected at each coffee house A (404), B (406), C (408), and D (410) in the tasks described above, it is also possible that the tasks require an owner associated with each worker device 412, 416, 418, and 422 to enter a number of people inside or in line at the respect coffee shop A (404), B (406), C (408), and D (410). It is also possible that the tasks require that a microphone on each worker device 412, 416, 418, and 422 be activated to measure ambient noise level in each coffee shop A (404), B (406), C (408), and D (410), and the ambient noise levels be used to estimate which coffee shop A (404), B (406), C (408), and D (410) is least crowded or has a more pleasant atmosphere.

The mobile service platform described above can manage tasks to accomplish many other applications as well. For example, mobile flow experiments having a goal of capturing flow data in different areas for inter-company research can be performed as a series of tasks implemented by opportunistically selected worker devices. Context-aware interactive applications can be implemented as well. For example, different advertisements, music, videos, etc., can be sent to a worker device based on a location or activity of the worker device and the owner of the worker device can be asked for his/her opinion or the relevance of the content. Other examples include determining a fastest ski lift at a ski resort based on speed and position of mobile worker devices carried by skiers, and event recording that combined recordings from multiple worker devices at a location or event into a single video or audio feed.

Another possible application is collecting information relating to buying a house. In particular, worker devices can be selected based on location to collect, pollution information, traffic information, temperature data, locations of nearby businesses, population demographics in the area, sound levels, the opinions of workers living or passing nearby, etc., for a certain period (e.g., a month) in order to determine a quality of life in the neighborhood of the house. This data could also be re-used or re-sold to others in a similar situation.

Figure 5:
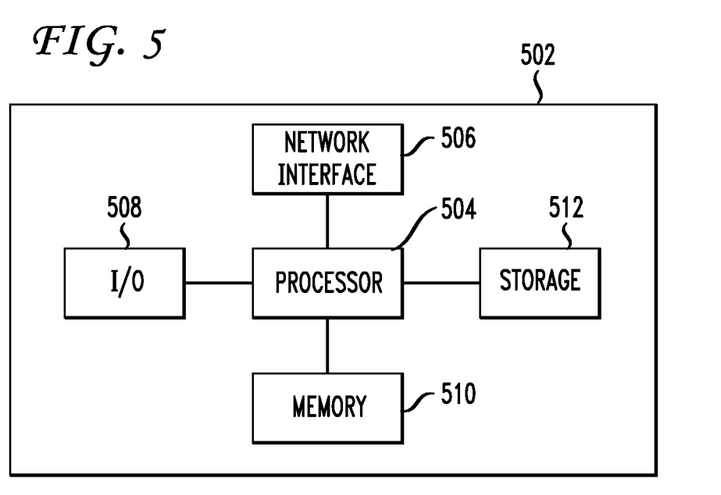
FIG. 5 is a high level block diagram of a computer.

The above described opportunistic crowd based service platform and the above-described methods for delivering opportunistic crowd based service may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium, (e.g., magnetic disk) and loaded into memory 510 when execution of the computer program instructions is desired. Thus, the operations described above, including the method steps illustrated in FIGS. 2 and 3 and the operations of the various components of the mobile service platform, may be defined by the computer program instructions stored in the memory 510 and/or storage 512 and controlled by the processor 504 executing the computer program instructions. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method comprising:
receiving, at a mobile service platform, a request from a mobile device to perform a task;
generating, on a visual interface of a worker device that is part of a group of worker devices, an augmented reality view that visualizes the task and other available tasks, wherein the augmented reality view identifies locations that the task and the available tasks are to be performed;
generating, by utilizing the worker device, a heat map that indicates a concentration of tasks at the locations identified in the augmented reality view;
selecting, by utilizing the mobile service platform, the worker device from the group of worker devices to complete the task, wherein the selecting of the worker device is based on a current attribute of the worker device, wherein the worker device is selected based on a sensor capability of a sensor of the worker device and a network latency affecting a rate at which the worker device is able to complete the task, wherein the group of worker devices has device-specific accounts registered with the mobile service platform, wherein the selecting is performed by utilizing instructions from a memory that are executed by a processor;
detecting the selected worker device when the selected worker device is active, wherein the selected worker device is detected based on software installed on the worker device that is in communication with the mobile service platform;
providing, by utilizing the software installed on the worker device, a notification of a presence of the selected worker device to other worker devices in the group of worker devices;
detecting that a different worker device from the group of worker devices is in proximity to the selected worker device;
determining a battery level of the selected worker device and the different worker device;
comparing the battery level to a threshold level required for processing the task;
generating a voice channel between the selected worker device and the different worker device to enable communication between the selected worker device and the different worker device;
processing and completing, by utilizing the selected worker device and the different worker device and when, based on the comparing, the battery level of the selected worker device and the different worker device is at the threshold level required to process the task, the task requested by the mobile device;

receiving, at the mobile service platform and from the selected worker device and the different worker device, data generated by completion of the task by the selected worker device and the different worker device, wherein the data is based on input to the worker device related to observations required by the task, wherein the data includes signal strength data and an average throughput data associated with the completion of the task;

reconstructing a three-dimensional image based on the data received from the selected worker device and the different worker device, wherein the three-dimensional image includes the data; and presenting, by utilizing the mobile service platform, the data generated by completion of the task and the three-dimensional image to the mobile device.

2. The method of claim 1, wherein the selecting further comprises:
selecting the worker device that is capable of completing the task based on the worker device being at a location associated with the task.

3. The method of claim 1, wherein the selecting further comprises:
selecting the worker device based on current environmental conditions at the worker device.

4. The method of claim 1, wherein the selecting further comprises:
selecting the worker device based on demographic information.

5. The method of claim 1, wherein the selecting further comprises:
scheduling the task in a pool of tasks stored at the mobile service platform;
detecting current attributes of the group of worker devices having the device-specific accounts registered with the mobile service platform at a scheduled time for the task; and
selecting one of the group of worker devices having the device-specific accounts registered with the mobile service platform based on the current attributes of the group of worker devices having the device-specific accounts registered with the mobile service platform at the scheduled time for the task.

6. The method of claim 1, wherein the selecting further comprises:
scheduling the task in a pool of tasks stored at the mobile service platform;
detecting current attributes of the group of worker devices having the device-specific accounts registered with the mobile service platform; and
selecting the worker device to perform the task when the current attributes of the worker device match specified attributes associated with the task.

7. The method of claim 1, wherein the task requires a device-based sensor reading, and the selecting further comprises:
selecting the worker device capable of providing the device-based sensor reading at a location associated with the task.

8. The method of claim 1, further comprising:
transferring a reward to the worker device in response to the worker device completing the task.

9. The method of claim 8, wherein transferring the reward to the worker device in response to the worker device completing the task comprises:
transferring a payment from an account of the mobile device to an account associated with the worker device.

10. The method of claim 1, further comprising:
validating the data generated by completion of the task prior to presenting the data to the mobile device.

11. The method of claim 10, further comprising:
transferring a payment from an account of the mobile device to an account associated with the worker device in response to the data being validated.

12. The method of claim 1, further comprising:
re-selling the data resulting from completion of the task to a second mobile device.

13. A mobile service platform comprising:
a memory that stores instructions; and
a processor that executes the instructions to perform operations, the operations comprising:
receiving, from a mobile device, a request to perform a task;
generating, on a visual interface of a worker device that is part of a group of worker devices, an augmented reality view that visualizes the task and other available tasks, wherein the augmented reality view identifies locations that the task and the available tasks are to be performed;
generating, by utilizing the worker device, a heat map that indicates a concentration of tasks at the locations identified in the augmented reality view;
selecting the worker device from the group of worker devices to complete the task, wherein the selecting of the worker device is based on a current attribute of the worker device, wherein the worker device is selected based on a sensor capability of a sensor of the worker device and a network latency affecting a rate at which the worker device is able to complete the task, wherein the group of worker devices has device-specific accounts registered with the mobile service platform;
detecting the selected worker device when the selected worker device is active, wherein the selected worker device is detected based on software installed on the worker device that is in communication with the mobile service platform;
providing, by utilizing the software installed on the worker device, a notification of a presence of the selected worker device to other worker devices in the group of worker devices;
detecting that a different worker device from the group of worker devices is in proximity to the selected worker device;
determining a battery level of the selected worker device and the different worker device;
comparing the battery level to a threshold level required for processing the task;
generating a voice channel between the selected worker device and the different worker device to enable communication between the selected worker device and the different worker device;
processing and completing, by utilizing the selected worker device and the different worker device and when, based on the comparing, the battery level of the selected worker device and the different worker device is at the threshold level required to process the task, the task requested by the mobile device;
receiving, from the selected worker device and the different worker device, data generated by completion of the task by the selected worker device and the different worker device, wherein the data is based on input to the worker device related to observations required by the task;

reconstructing a three-dimensional image based on the data received from the selected worker device and the different worker device, wherein the three-dimensional image includes the data; and presenting the data generated by completion of the task and the three-dimensional image to the mobile device.

14. The mobile service platform of claim 13, wherein the operations further comprise:

transferring a reward to the worker device in response to the worker device completing the task.

15. The mobile service platform of claim 13, wherein the operations further comprise:

validating the data generated by completion of the task prior to presenting the data to the mobile device.

16. The mobile service platform of claim 15, wherein the operations further comprise:

transferring a payment from an account of the mobile device to an account associated with the worker device in response to the data being validated.

17. A non-transitory computer readable medium storing computer executable instructions, which when executed on a processor, cause the processor to perform operations comprising:

receiving a request, from a mobile device, to perform a task;

generating, on a visual interface of a worker device that is part of a group of worker devices, an augmented reality view that visualizes the task and other available tasks, wherein the augmented reality view identifies locations that the task and the available tasks are to be performed;

generating, by utilizing the worker device, a heat map that indicates a concentration of tasks at the locations identified in the augmented reality view;

selecting the worker device from the group of worker devices to complete the task, wherein the selecting of the worker device is based on a current attribute of the worker device, wherein the worker device is selected based on a sensor capability of a sensor of the worker device and a network latency affecting a rate at which the worker device is able to complete the task, wherein the group of worker devices has device-specific accounts registered with the mobile service platform;

detecting the selected worker device when the selected worker device is active, wherein the selected worker device is detected based on software installed on the worker device that is in communication with the mobile service platform;

providing, by utilizing the software installed on the worker device, a notification of a presence of the selected worker device to other worker devices in the group of worker devices;

detecting that a different worker device from the group of worker devices is in proximity to the selected worker device;

determining a battery level of the selected worker device and the different worker device;

comparing the battery level to a threshold level required for processing the task;

generating a voice channel between the selected worker device and the different worker device to enable communication between the selected worker device and the different worker device;

processing and completing, by utilizing the selected worker device and the different worker device and when, based on the comparing, the battery level of the selected worker device and the different worker device is at the threshold level required to process the task, the task requested by the mobile device;

receiving, from the selected worker device and the different worker device, data generated by completion of the task by the selected worker device and the different worker device, wherein the data is based on input to the worker device related to observations required by the task;

reconstructing a three-dimensional image based on the data received from the selected worker device and the different worker device, wherein the three-dimensional image includes the data; and presenting the data generated by completion of the task and the three-dimensional image to the mobile device.

18. The non-transitory computer readable medium of claim 17, wherein the operations further comprise:

transferring a reward to the worker device in response to the worker device completing the task.

19. The non-transitory computer readable medium of claim 17, wherein the operations further comprise:

validating the data generated by completion of the task prior to presenting the data to the mobile device.

20. The non-transitory computer readable medium of claim 19, wherein the operations further comprise:

transferring a payment from an account of the mobile device to an account associated with the worker device in response to the data being validated.

* * * * *